(No Model.)
2 Sheets—Sheet 1.
H. B. WEAVER & H. S. PHILLIPS.
OVERHEAD BICYCLE RAILWAY.
No. 547,528.
Patented Oct. 8, 1895.
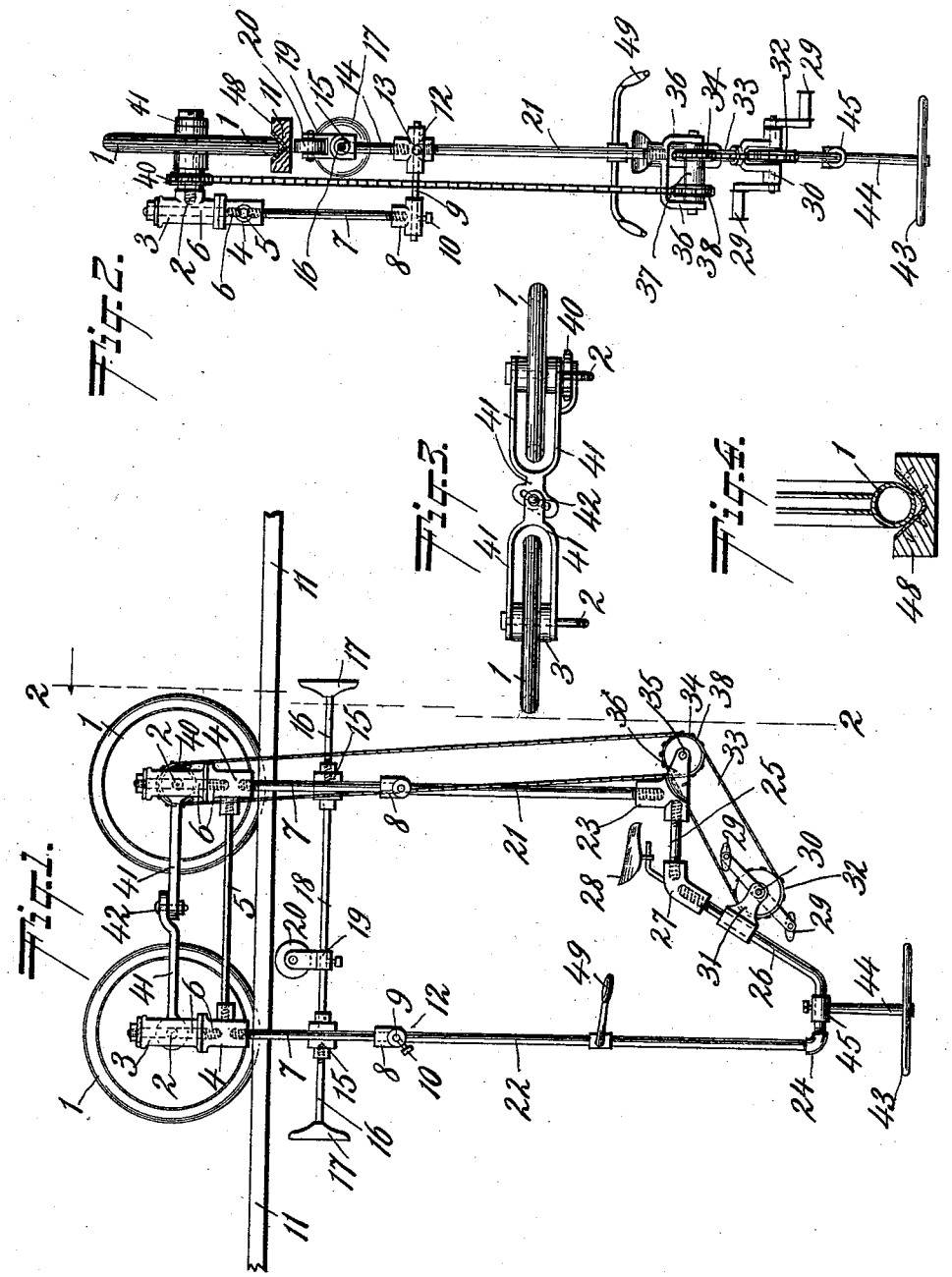
Attest:
F. H. Schott
Alfred T. Gage
Inventors
Henry Baron Weaver
Harry Simmons Phillips,
by their Attorney (No Model.)
2 Sheets—Sheet 2.
H. B. WEAVER & H. S. PHILLIPS.
OVERHEAD BICYCLE RAILWAY.
No. 547,528. Patented Oct. 8, 1895.
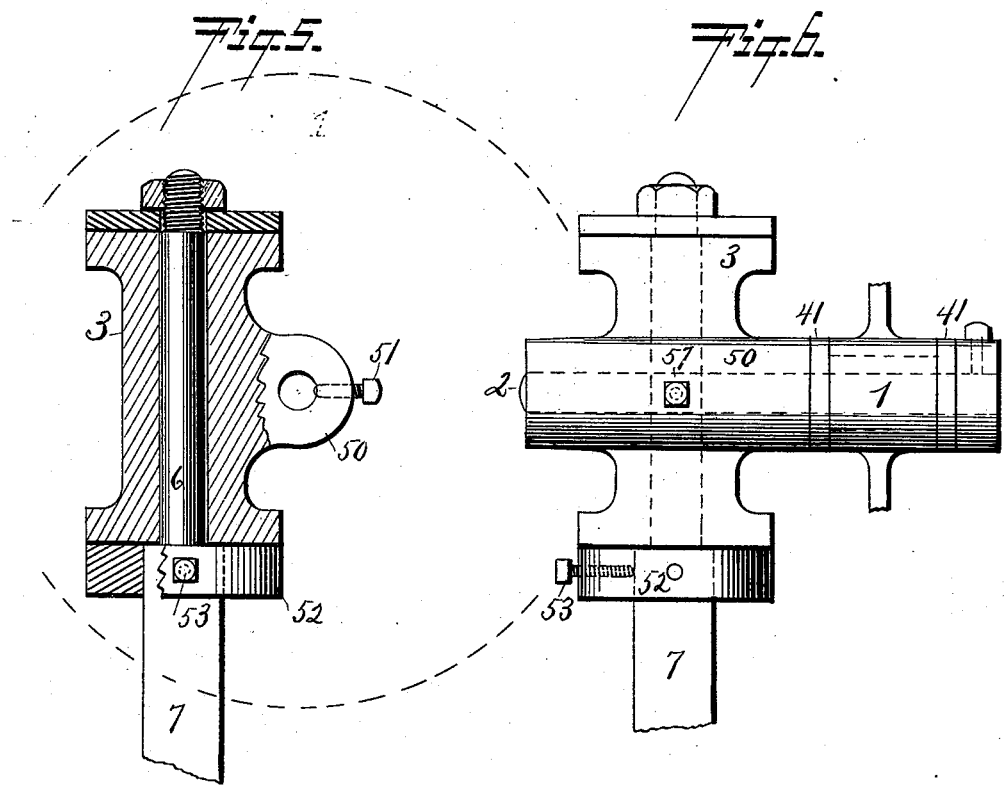

UNITED STATES PATENT OFFICE.

HENRY BACON WEAVER AND HARRY SIMONS PHILLIPS, OF BURLINGTON, NEW JERSEY; SAID PHILLIPS ASSIGNOR TO SAID WEAVER.

OVERHEAD BICYCLE-RAILWAY.

SPECIFICATION forming part of Letters Patent No. 547,528, dated October 8, 1895.

Application filed July 13, 1893. Serial No. 480,368. (No model.)

*To all whom it may concern:*

Be it known that we, HENRY BACON WEAVER and HARRY SIMONS PHILLIPS, citizens of the United States, residing at Burlington, in the county of Burlington and State of New Jersey, have invented certain new and useful Improvements in Overhead Bicycle-Railways; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to overhead bicycles; and it has for its object to provide such a bicycle which will be quick in its movement as well as steady, and which is particularly well adapted for use by ladies, as the parts will be arranged so as not to interfere in any way with the dress; and it has further for its object to generally improve the construction and the arrangement of the parts of such a bicycle which will render it light and at the same time strong and durable and attractive in appearance, and one in which the several parts can be readily assembled and disassociated when necessary, and in which a better adjustment of the several parts can be obtained.

To the accomplishment of the foregoing and such other objects as may hereinafter appear the invention consists in the construction, and also in the combination of parts hereinafter particularly described, and then sought to be particularly defined by the claims, reference being had to the accompanying drawings, forming a part hereof, in which—

Figure 1 is a side elevation of the bicycle mounted upon the supporting-way. Fig. 2 is a rear end view of the same. Fig. 3 is a detail plan view of connecting-yokes. Fig. 4 is a perspective illustrating the form of track employed and showing the form of the wheel-rim and the manner in which the same fits in the track. Fig. 5 is a detail vertical section through the preferred form of swiveled bearing on a larger scale than the preceding figures, and Fig. 6 is an end elevation of the same at right angles to Fig. 5 and showing a portion of the front wheel-hub.

In the drawings the numeral 1 designates the front and the rear wheels, each of which is mounted to turn upon a shaft 2, both of which project laterally from swiveled bearings 3, mounted upon fittings or blocks 4, connected together by a cross-bar 5, extending from the front to the rear wheel. The fittings or blocks 4 are preferably T-couplings, into which the opposite ends of the rods 5 are screwed, and into the tops of which couplings are screwed pins 6, which project above the top of the couplings and enter recesses formed in the lower faces of the bearings 3, so that the latter may turn thereon and thus be swiveled to the fittings or blocks. These pins have suitable connection with the bearings to hold them and the blocks together and yet permit the bearings to turn, which may be effected by providing a washer and nut above the tops of the bearings or otherwise. Into the lower faces of the T-couplings 4 are screwed the upper ends of the pendent rods 7, which have screwed onto their lower ends the T-couplings 8, through which extend lateral rods 9, which are laterally adjustable in said couplings and are secured to their adjustment by means of the set-screws 10. The rods 9 are thus suspended below the rail 11 and have secured to their outer ends, at a point beneath the front and rear wheels 1, couplings 12, which are preferably four-way couplings, and which likewise are adjustable on the rods 9 and held to their adjustment by the set-screws 13. Into the upper ends of the couplings 12 are screwed the short rods 14, to the upper ends of which are secured couplings 15, preferably of T form, and into which are screwed the rods 16, so as to extend parallel with the track at points beneath both the front and the rear wheels and which bear at their ends the blocks 17, so as to constitute bumpers to receive the blow of other bicycles on the track if two bicycles should come together. By extending bumpers in line with the track-rail it overcomes the tendency of the wheels to jump the track in a collision, and thus overcomes a serious objection in a structure of this character, which would exist if the bumper lay to one side of the track. A bar 18 connects the two couplings 15, and besides serving to assist in bracing the frame, also serves as a support for an adjustable bracket 19, which will carry a roll 20 in proximity to the lower face of the rail 11, so as to prevent the bicycle from jumping the track.

Into the lower portions of the couplings 12 there is screwed the upper ends of the rods 21 and 22, which have screwed onto their lower ends the couplings 23 and 24, by means of which and the intermediate rods 25 and 26 the two rods or hangers 21 and 22 are connected together at their lower ends, the rods 25 and 26 being coupled together at their adjacent ends by the couplings 27 and at their other ends screwed, respectively, to the couplings 23 and 24. It will be observed that the rod or hanger 21, which is beneath the rear wheel of the bicycle, terminates some distance above the lower end of the rod or hanger 22, and that the rod 25 extends inwardly from the hanger 21, and the rod 26 then extends forwardly in an inclined position to the rod or hanger 22. This leaves a space to the rear of the rod 26 and underneath the rod 25, which can be occupied by one section of the driving-chain, and brings the seat 28 to such a position that the lady seated thereon can operate the pedals 29 conveniently and without liability of her dress catching in the driving-chain. The shaft 30 of the pedals 29 has its bearing in the bracket 31, extending to the rear of the rod 26, and carries a sprocket-wheel 32, from which a drive-chain 33 extends to a sprocket-wheel 34, mounted so as to turn upon a shaft 35, which is supported by ears 36, projecting from the coupling 23. The sprocket-wheel 36 is connected by a sleeve or collar or hub 37 to a sprocket-wheel 38, so that the two sprocket-wheels will turn together, and a drive-chain extends from the sprocket-wheel 38 to a sprocket-wheel 40 on the hub of the rear wheel of the bicycle. Motion is transmitted to the wheels 1 through the sprocket-wheels and the chains just described as power is imparted by working the pedals 39, and thus the machine is propelled. By arranging the sprocket drive-chains in the manner described they are brought to the rear of the machine and to a position that will not interfere with the dress-skirts of the lady operating the bicycle and to a point where they will not interfere with the convenience or comfort of the person, male or female, operating the bicycle.

If desired, that portion of the bicycle-frame which extends above the track may be additionally braced by means of two yokes 41, which will be connected at their forked ends to the shafts, respectively, of the front and rear wheels of the bicycle and be coupled together at a point between said wheels by means of a pivot or swivel bolt 42.

For the purpose of checking any tendency of the machine to sway, we provide at the lower part of the frame a wheel or roller 43, which is free to turn in a horizontal plane on a shaft or rod 44, connected at its upper end by a sleeve 45, encircling the rod 26 and secured thereto in any adjusted position by a set-screw; but it is obvious that instead of using this sleeve 45 there may be placed the common form of T-coupling in the length of the lower portion of the rod 26 and the upper end of the rod 44 may be screwed into such a coupling. This is such a well-known form of coupling that it is not deemed necessary to illustrate it in the drawings. It may be stated that the wheel or roller 43 will bear at its periphery against a guide-rail, which will be provided, but is not illustrated in the drawings, as such feature is not claimed in this application.

We have found from numerous experiments that there are many objections to the form of track now commonly employed in overhead bicycles by which the easy, smooth, and rapid running of the bicycle is materially interfered with, and with the view of overcoming such objections we employ for our particular form of bicycle the construction of track and bicycle-wheel which have been found to overcome many of the objections to other forms and to give superior results in the running of the machines to other forms heretofore employed. In carrying out this feature we take an ordinary angle-iron and support it so as to afford a V-shaped groove for the wheel of the bicycle to run in, the angle-iron preferably being fitted into a timber 48, as illustrated in Fig. 4 of the drawings, and for this form of rail we give to the periphery of the wheel a rounded form in cross-section, so that the contact between the wheel and the face of the V-shaped track will be at the two opposite points of an arc of a circle, or, in other words, the bearing contact between the periphery of the wheel and the V-shaped rail will be like the contact between the opposite sides of a ball-bearing rolling in the V-shaped rail, and in effect we get practically such a bearing under this construction which we have devised. This affords a very material improvement over other forms, inasmuch as it not only reduces the friction between the wheel and the rail to the minimum, but also tends to keep the wheel more evenly in contact with the rail, and yet with only two small points of contact with the rail. This is of special advantage in a bicycle of this character, because there is a tendency for the bicycle to be thrown more or less to one side when in use and under ordinary circumstances to bring a greater surface contact between the periphery of the wheel and a grooved rail; but by forming the rail and the periphery of the wheel in the manner which we have described this is obviated, and a practically ball-bearing afforded, so that the bicycle will have a greater tendency to swing perpendicularly, and the minimum surface contact will exist between the wheel and the rail. Other advantages of this construction will be apparent to those skilled in the art. A handle 49 for the use of the rider in steadying the machine and holding on may be employed. A brake (not illustrated because not claimed herein) may also be provided for checking or stopping the machine when desired.

We have described with particularity the details of construction for the purpose of illustrating what is believed to be the best construction and arrangement of the several parts; but the invention is not restricted to such details, except where specifically claimed, as it is obvious that many alterations can be made therein without departing from the spirit of our invention.

As one illustration of a change, the swiveled bearings for the wheels may be formed as shown in Figs. 5 and 6 of the drawings, wherein the swiveled bearing 3 is formed with a boss 50 on the side of the bearing, and in which the axle 2 of the wheel 1 will be held by a set-screw 51, and instead of having the block 4, on which the swiveled bearing turns, of the form illustrated in Fig. 1, it may be of the form illustrated in Figs. 5 and 6, where it is represented as a collar 52, held to the rod 7, which may be of angular form, by a set-screw 53, and the pin or journal 6 may be a continuation of the rod 7, as illustrated.

The foregoing illustrations are some changes that may be made in the form of parts of the machine, and it will be obvious that other changes may be made.

Having described our invention and set forth its merits, what we claim is—

1. In an overhead bicycle railway, the combination of the front and rear wheels, the swiveled bearings located to one side of the wheels, one for each of said wheels, the shafts of the wheels connected to said bearings and projecting laterally to one side of the swivel, the blocks or fittings on which said swiveled bearings are free to turn, and the rods depending from said blocks and sustaining the lower portion of the bicycle frame, substantially as and for the purposes described.

2. In an overhead bicycle railway, the combination of the front and rear wheels, the depending rods and intermediate connections between them and the shafts of said wheels, the rods constituting the lower portion of the frame carrying the power transmitting mechanism, and the laterally extending arms connecting the rods of the lower portion of the frame with the rods of the upper portion of the frame, and permitting the lateral adjustment of the lower portion of the frame, substantially as and for the purposes described.

3. In an overhead bicycle railway, the combination of the front and rear wheels, the vertical rods beneath the track on which said wheels run and connections between the upper ends of said rods and the shafts of said front and rear wheels, one of said vertical rods having its lower end terminating above the lower end of the other rod, rods connecting the lower ends of the two vertical rods, a system of chain gearing applied at the rear of the machine and extending from the foot pedals up to the rear wheel of the two running wheels, and means for imparting motion to said system of chain gearing, substantially as and for the purposes described.

4. In an overhead bicycle railway, the combination with the front and rear wheels, of the frame connected with said wheels and lying below the rail on which the wheels travel and composed of vertical bars or rods, one of which terminates at its lower end above the lower end of the other bar or rod, the lower end of the two rods or bars being connected together, the two sprocket wheels one supported adjacent to the lower end of the shorter of said two rods and the other supported at a point intermediate of the two rods, a sprocket chain connecting said sprocket wheels, a third sprocket wheel supported adjacent to the sprocket wheel at the lower end of the shorter rod, a sprocket wheel connected with one of the running wheels, a chain connecting said sprocket wheel and one of the lower sprocket wheels, and means for transmitting motion to said sprocket wheels and chain, substantially as and for the purposes described.

5. In an overhead bicycle railway, the combination of the front and rear wheels to run upon an elevated track, swiveled bearings to which the axles of said wheels are connected, said bearings being located to one side of said wheels and adapted to lie to one side of the track on which the wheels run a frame suspended from said bearings and lying beneath the track on which the bicycle travels, a rod extending parallel with the track and connecting the front and rear of the suspended frame beneath said track, and a roller sustained by said rod adjacent to the under side of the track to guard against the bicycle jumping the track, substantially as and for the purposes described.

6. In an overhead bicycle railway, the combination of the front and rear wheels to run upon a track, a frame suspended from both of said wheels and extending below the track, and carrying means to prevent vertical movement and lateral swaying such as would throw the wheeled frame from the track, a foot pedal at the lower portion of said frame, a toothed wheel connected with one of the wheels running upon the track, a second toothed wheel sustained from said frame, means connecting said toothed wheels for transmitting motion from one to the other, and means intermediate of said second toothed wheel and foot pedal and having connection with said wheel and pedal for transmitting power from the pedal to said second wheel, substantially as and for the purposes described.

7. In a pleasure railway, the combination with an overhead track-rail, of a wheeled carriage suspended from and traveling on said track-rail, an endwise extending bumper beneath and in line with said track-rail, a device to contact with said track-rail to hold the carriage to the track when the endwise extending bumper contacts with another body, and foot-operating mechanism sustained by the carriage for propelling the same, substantially as and for the purposes described.

8. In a pleasure railway, the combination with an overhead track-rail, of a wheeled carriage suspended from and traveling on said track-rail, an endwise extending bumper, a device to contact with said track-rail to prevent vertical movement and throwing of the carriage from the said track by contact of the endwise extending bumper with another body, means to prevent the lateral swaying of the carriage, and a foot-operating mechanism sustained by the carriage for propelling the same, substantially as and for the purposes described.

9. In an overhead bicycle railway, the combination of the front and rear wheels to run upon a track, a frame suspended from said wheels and extending below the track and carrying means to prevent vertical movement and lateral swaying such as would throw the wheeled frame from the track, a foot pedal at the lower portion of said frame, and means between said foot pedal and one of the wheels running upon the track for transmitting motion from said pedals to said wheel, substantially as and for the purposes described.

10. In an overhead bicycle railway, the combination of the front and rear wheels to run upon a track, a frame suspended from said wheels and lying below the track, a foot pedal at the lower portion of said frame, a sprocket wheel connected with one of the wheels running upon the track, a second sprocket wheel sustained from said frame at one side thereof, a chain connecting said sprocket wheels, and a second chain and sprocket wheels for the same to run on, said wheels having connection one with the foot pedals between the sides of the frame and the other with the lower sprocket wheel of the first mentioned chain to one side of the frame whereby said chains are brought to a position below the bicycle seat and to one side of the suspended frame, substantially as and for the purposes described.

11. In an overhead bicycle railway, the combination of the front and rear wheels to run upon a track, the bearings to which the axles of said wheels are connected, the fittings or blocks to which said bearings are swiveled, the transverse rod connecting the said fittings or blocks, the rods depending from said fittings or blocks, the couplings at the lower ends of said blocks or fittings, the arms extending laterally from said couplings, and the frame suspended from said arms and sustaining the seat and power transmitting mechanism, substantially as and for the purposes described.

12. In an overhead bicycle railway, the combination of the front and rear wheels to run upon a track, the rods sustained from the axles of said wheels and depending below the track, the arms extending laterally from the lower ends of said rods, the frame supporting the seat and power transmitting mechanism suspended from said arms, rods extending upwardly from said arms and connected together by a transverse rod, and a bumper supported laterally from said upright rods, substantially as and for the purposes described.

13. In an overhead bicycle railway, the combination of the front and rear wheels to run upon a track, the frame carrying the seat and power transmitting mechanism, said frame comprising the upright rods one of which terminates at its lower end above the other, the rod extending inwardly from the shorter of the two upright rods, the rod extending downwardly and connecting said inwardly extending rod with the longer of the two upright rods, and connections between the several rods, substantially as and for the purposes described.

14. In an overhead bicycle railway, the combination with the front and rear wheels, of the swiveled bearings to which the axles of said wheels are connected, and the yokes having connections with said axles and united together at a point between said wheels, substantially as and for the purposes described.

15. In an overhead bicycle railway, the combination with the track-wheels and frame suspended beneath the track, of bearings for said wheels intermediate of the wheels and suspended frame, and adapted to lie to one side of the track and vertical journals adapted to lie to one side of the track and on which said wheel-bearings are rotatable whereby the wheels are free to follow curvatures or deflections in the track, substantially as and for the purposes described.

16. In an overhead bicycle railway, the combination with the track-wheels and frame suspended beneath the track, of bearings for said wheels, said bearings supporting horizontally the journals adapted to lie to one side of the track and of the wheels, and vertical journals on which said wheel-bearings are rotatable, substantially as and for the purposes described.

In testimony whereof we affix our signatures in presence of two witnesses.

HENRY BACON WEAVER.
HARRY SIMONS PHILLIPS.

Witnesses:
HENRY S. PRICKETT,
EDWARD C. ROBBINS, Jr.